(12) United States Patent
Hadjiloucas et al.

(10) Patent No.: US 7,578,194 B1
(45) Date of Patent: Aug. 25, 2009

(54) DIFFERENTIAL FLUID PRESSURE MEASUREMENT APPARATUS

(75) Inventors: Costas Hadjiloucas, Providence, RI (US); Andrew Willner, Attleboro, MA (US); Andrew Amatruda, Attleboro, MA (US); George Krajewski, Coventry, RI (US)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 12/069,522

(22) Filed: Feb. 11, 2008

(51) Int. Cl.
*G01L 13/02* (2006.01)
(52) U.S. Cl. .......................... 73/716; 73/736
(58) Field of Classification Search .................. 73/716, 73/736, 756, 727
See application file for complete search history.

(56) References Cited

U.S. PATENT DOCUMENTS

| | | | | |
|---|---|---|---|---|
| 3,492,872 A | * | 2/1970 | Ziegler et al. | 73/722 |
| 3,901,082 A | * | 8/1975 | Lyon | 73/708 |
| 4,909,083 A | * | 3/1990 | Fazeli et al. | 73/706 |
| 6,813,953 B2 | * | 11/2004 | Baba et al. | 73/715 |
| 7,197,936 B2 | | 4/2007 | Baba | |
| 7,464,599 B2 | * | 12/2008 | Silverbrook et al. | 73/708 |
| 2003/0200813 A1 | * | 10/2003 | Baba et al. | 73/715 |

* cited by examiner

*Primary Examiner*—Andre J Allen
(74) *Attorney, Agent, or Firm*—Russell E. Baumann

(57) ABSTRACT

A differential liquid pressure sensor (10) has an upper housing (12) that mounts a connector portion (12*a*) and receives in a recess a sense element module (14). The sense element module is a body in which a generally U-shaped oil filled passageway (14*h*) is formed with openings at opposite ends provided on respective first and second diaphragm mounting surfaces. A fluid pressure sense element, such as a piezoresistive sense element (15) is disposed in one of the passageway openings and flexible metal diaphragms (14*a*, 14*b*) are mounted on the respective diaphragm mounting surfaces of the module facing a common direction. A lower housing (18) having first and second port connections for the respective diaphragms is disposed on the lower surface of the module.

13 Claims, 8 Drawing Sheets

US 7,578,194 B1

DIFFERENTIAL FLUID PRESSURE MEASUREMENT APPARATUS

FIELD OF THE INVENTION

This invention relates generally to apparatus for measuring fluid pressure and more particularly to such apparatus providing a media isolated differential pressure sensor using two diaphragms for placement in fluid communication with respective high and low pressure sources.

BACKGROUND OF THE INVENTION

Solid state pressure sense elements, such as piezoresistive pressure sense elements, are often isolated from the sensed media by a flexible metal diaphragm robust to the media to protect such sense elements. An incompressible fluid, typically silicone oil, is used to transfer pressure from the diaphragm to the sense element. It is conventional to provide first and second diaphragms facing opposite directions with the sense element disposed therebetween. To reduce the accumulation of substances, such as soot, water, condensate from the media on the diaphragm that could damage the sensor, it is often required to place the diaphragms in a drainable orientation relative to gravity and to the pressure ports. For example, in U.S. Pat. No. 7,197,936, issued Apr. 3, 2007, the diaphragm surfaces are oriented parallel to the direction of gravity. This results in a high aspect ratio which may also require the use of a bulky mounting bracket as shown in the patent to provide desired rigidity. Further, mounting of the diaphragms so that they face in opposite directions can result in having to use separate housing members that each needs to be robust with the sensed media.

SUMMARY OF THE INVENTION

It is an object of the present invention to provide a differential fluid pressure sensor that can easily be oriented so that the diaphragm surfaces are perpendicular to the direction of gravity. Another object of the invention is the provision of a differential fluid pressure sensor that is compact and one that can be made of less expensive materials than typically required. Yet another object of the invention is the provision of a differential fluid pressure sensor whose structure allows the use of time saving assembly operations.

Briefly, in accordance with a preferred embodiment of the invention a base is formed with a passageway extending between openings at two spaced apart diaphragm mounting surfaces that face a common direction. One opening is enlarged and receives a fluid pressure responsive sense element, such as a piezoresistive sense element assembly. The diaphragms and the passageway form two chambers that are filled with incompressible oil to transmit pressure to the sense element.

Having both diaphragms on one side of the base simplifies the assembly process. For example, forming adhesive rings for attachment of the diaphragms, positioning the diaphragms on the rings and curing the adhesive can be done at the same time for both diaphragms.

In the preferred embodiment of the invention described in detail below, the sense element is connected with wire bonds to one end of terminal pins with the other end of the pins bonded to a printed circuit board having conditioning circuits and this in turn is connected to connector terminals by means of metal springs. A sealant is placed around the pins to prevent oil leaks through the pin/base interface.

BRIEF DESCRIPTION OF THE DRAWINGS

Exemplary embodiments of the invention are presented in the drawings and described in the specification.

DETAILED DESCRIPTION OF PREFERRED EMBODIMENTS

Figure 1:
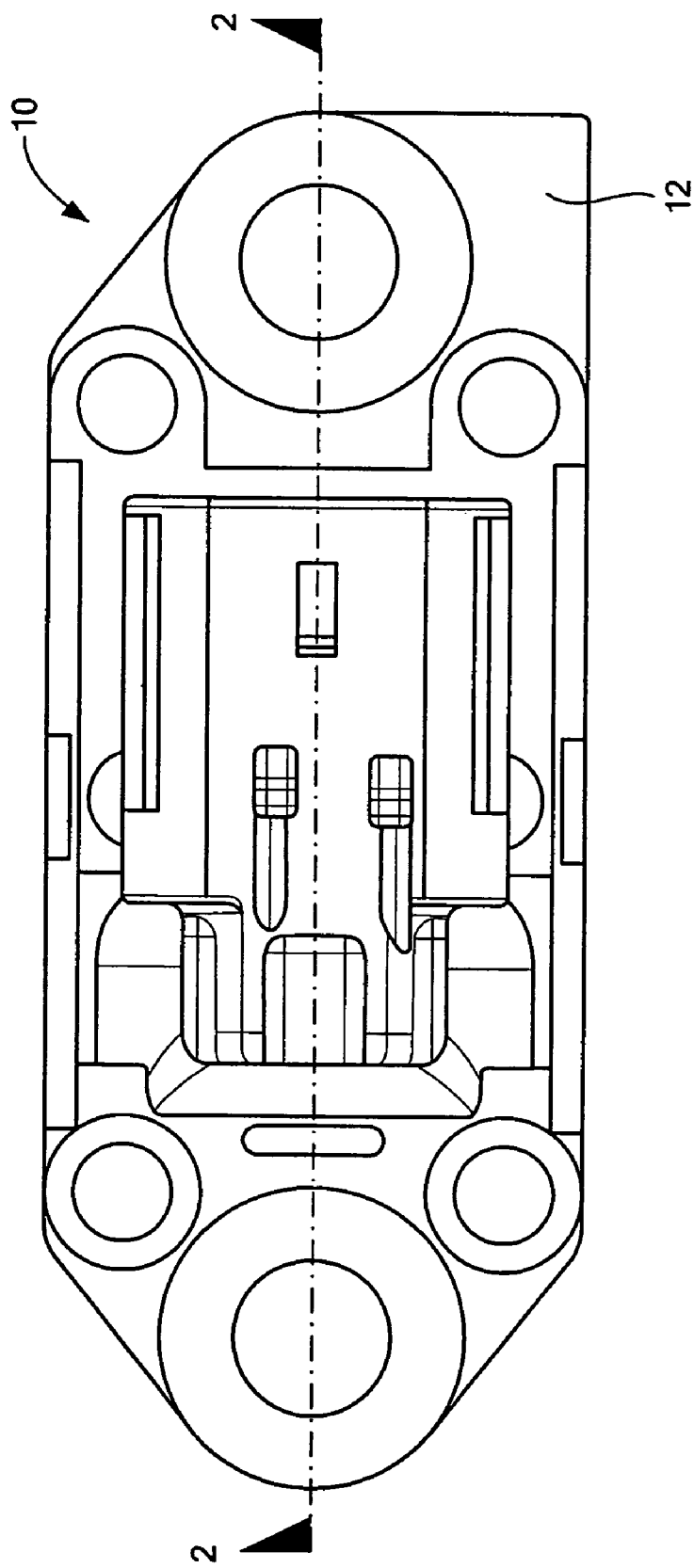
FIG. 1 is a top plan view of a sensor assembly made in accordance with a first preferred embodiment of the invention.
Figure 2:
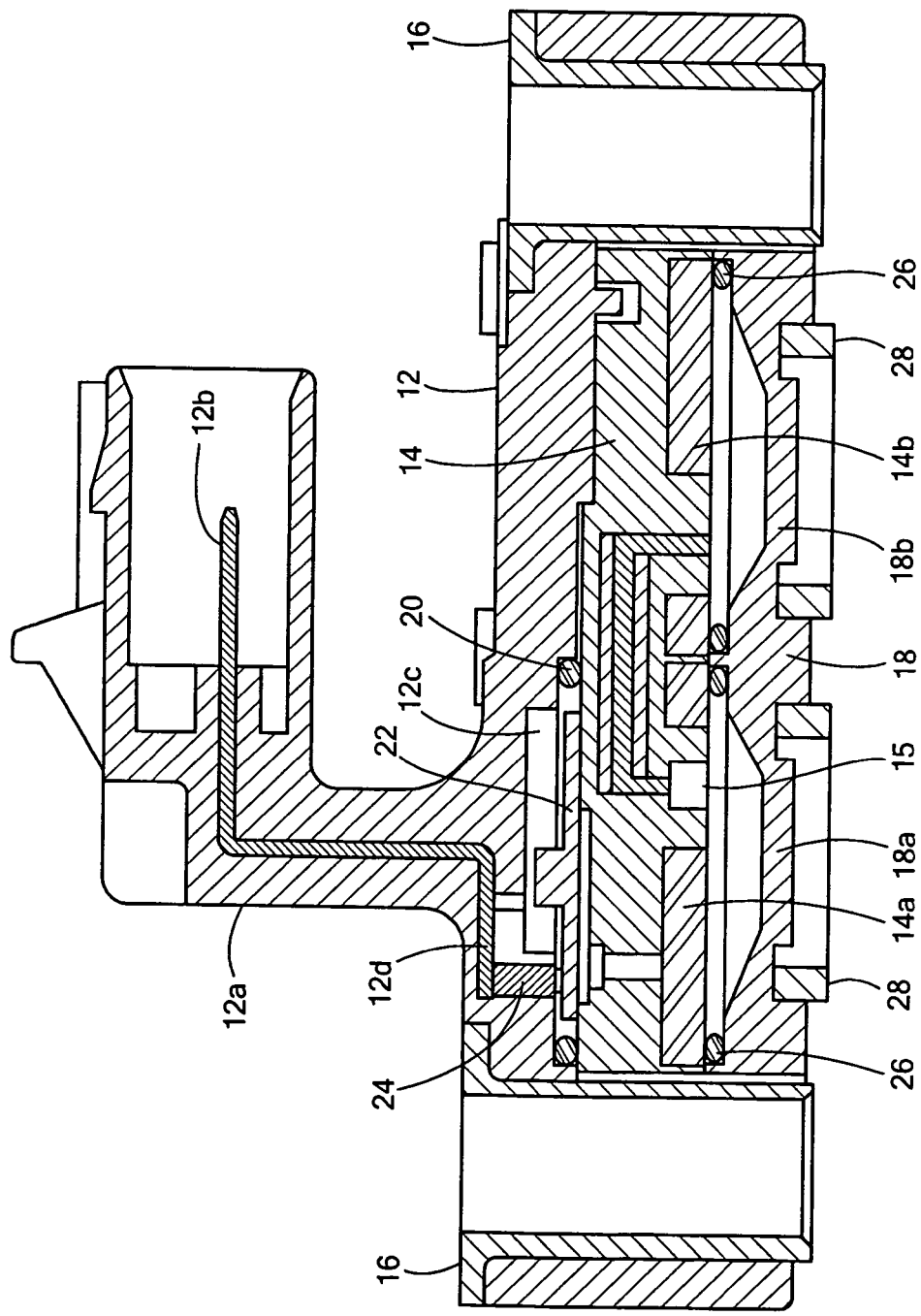
FIG. 2 is a cross sectional view taken on line 2-2 of FIG. 1.

With particular reference to FIGS. 1 and 2, a differential fluid pressure sensor assembly 10 made in accordance with a first preferred embodiment of the invention comprises an upper housing 12 of suitable moldable material such as PEI (polyetherimide) formed with a connector portion 12a having three insert molded terminals 12b (one of which is shown in FIG. 2). Upper housing 12 is formed with a recess for receipt of a sense element module 14 between metal bushings 16 for mounting the assembly to a support having ports of a high and a low fluid pressure source to be monitored. A lower housing 18 of suitable moldable material, such as PEI, is received in the recess of upper housing 12 below the pressure sense module as viewed in FIG. 2.

An environmental O-ring 20 is disposed in a seat formed in a circuit chamber 12c formed between upper housing 12 and the top surface of sense element 14. A circuit board 22 is disposed on top of sense element module 14 within chamber 12c. A contact spring 24 extends in a suitable bore in the wall of upper housing 12 between each respective end 12d of terminals 12b and circuit board 22, as shown by one such spring shown in FIG. 2. The bores are sealed with suitable material, such as RTV, following assembly and calibration.

Sense element module 14 comprises a body mounting first and second, side-by-side, generally circular metallic discs 14a, 14b to be discussed in further detail below. Lower housing 18 is formed with an O-ring seat aligned with each disc 14a, 14b for receipt of O-rings 26. Respective ports 18a and 18b preferably are formed with a grill like arrangement, such as cross bars defining openings to allow fluid flow therethrough, the FIG. 2 cross section being taken through one of the bars. External O-rings 28 are placed in suitable O-ring seats in the bottom surface of lower housing 18 around each port 18a, 18b to provide a fluid seal between the sensor assembly 10 and the housing (not shown) containing the high and low fluid pressure sources.

Figure 3:
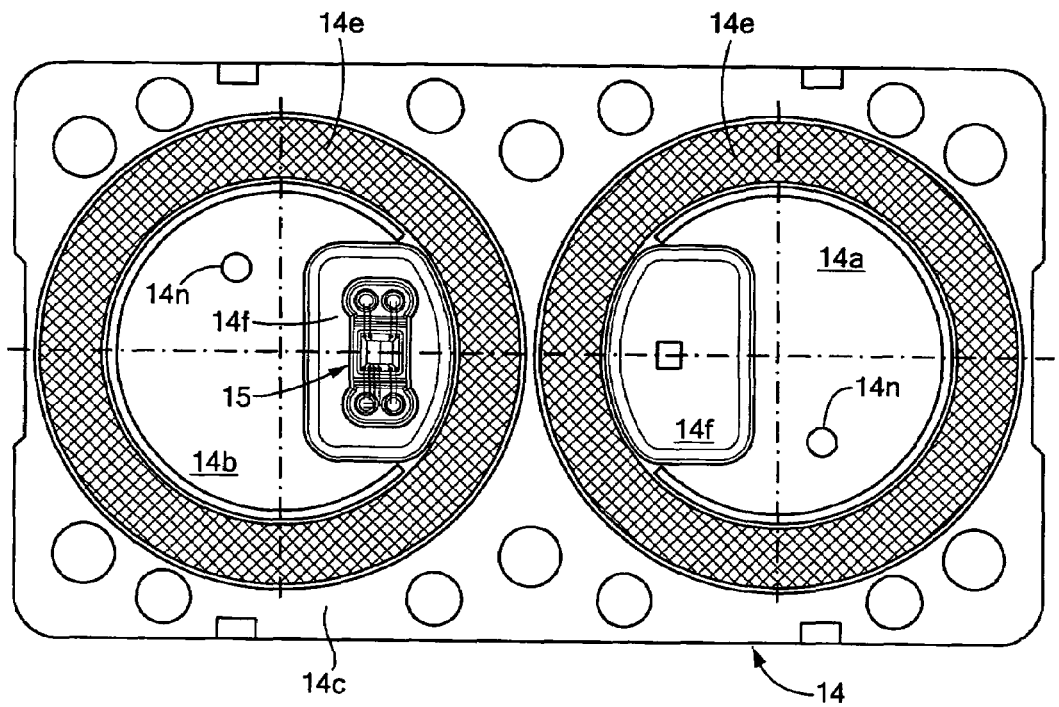
FIG. 3 is a bottom plan view of the sense element module shown in the FIG. 2 assembly but shown prior to the installation of the metallic diaphragms.
Figure 4:
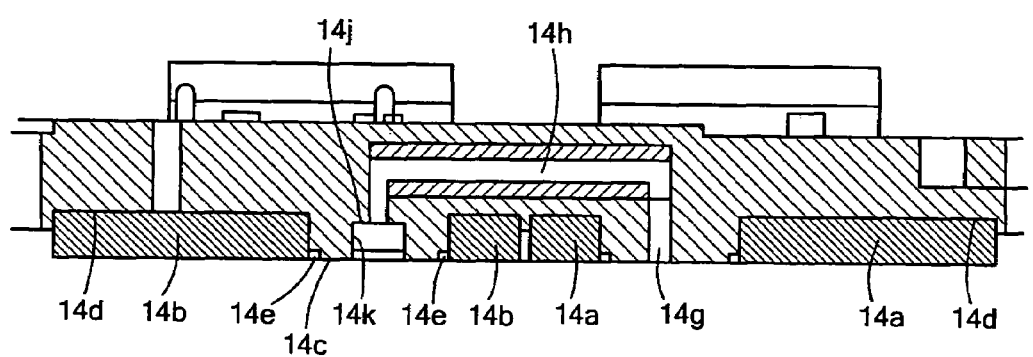
FIG. 4 is a cross sectional view of the FIG. 3 module taken through a passageway formed through the module.

With reference to FIGS. 3 and 4, sense element module 14 is shown prior to the installation of flexible metal diaphragms. Sense element module 14 is formed generally as a solid plate like base of suitable material, such as PPS (polyphenylene sulfide), having a flat bottom surface 14c. Recesses 14d are formed in bottom surface 14c configured to accommodate metal discs 14a, 14b so that the bottom surface of discs 14a, 14b face the same direction and preferably lie in a common plane. Discs 14a, 14b are each formed with a window 14f through the respective disc and recesses 14d are configured to extend into each window and form a channel 14e of a selected depth entirely around the perimeter of each window; the channel filled with an elastomeric sealant to prevent oil leaks.

Figure 5:
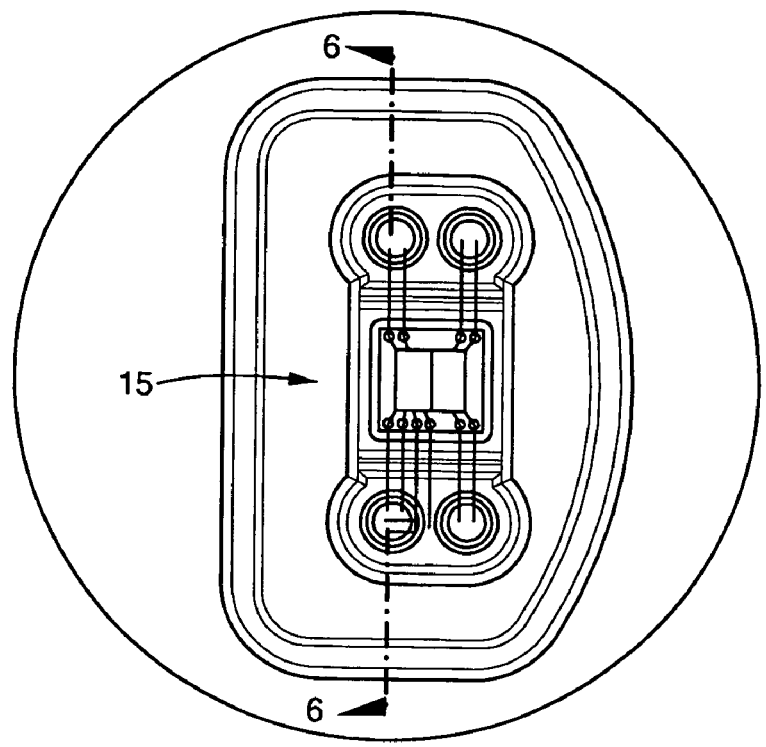
FIG. 5 is an enlarged portion of the FIG. 3 showing details of the sense element assembly.
Figure 6:
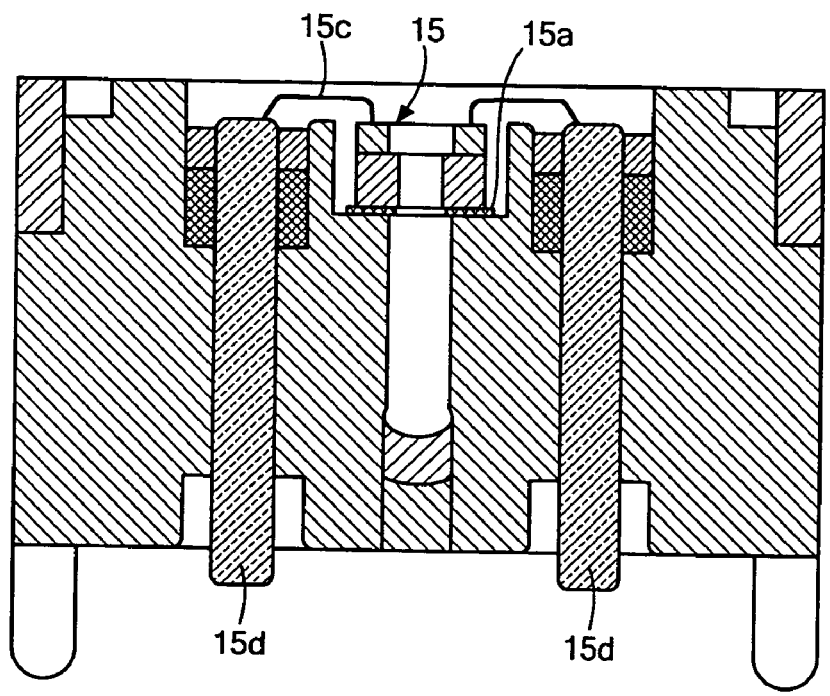
FIG. 6 is a cross sectional view taken along line 6-6 of FIG. 5.

A generally U-shaped passageway 14g is formed through the base of the module leading from an opening in surface 14c in window 14f of disc 14a to an opening in surface 14c in window 14f of disc 14b. According to a feature of the first embodiment, the bight portion of the U-shaped passageway is formed by a tube 14h of brass or other suitable material. An enlarged opening 14k at one end of the passageway in widow 14f of disc 14b is provided for placement of a pressure sense element, such as a piezoresistive element 15, as seen more clearly in FIGS. 5 and 6, attached to flange 14j of enlarged opening 14k by silicone-based adhesive material or other suitable adhesive material 15a. Wires 15c are bonded between sense element 15 and respective electrical terminal pins 15d. Adhesive and gel are used to provide a pressure tight seal between the terminal pins and the surrounding plastic.

Suitable adhesive material 14l of epoxy or silicone-based material is applied to the outer surface of discs 14a, 14b as shown in FIG. 3, as by dispensing or stenciling circular rings or other desired geometry beyond window 14f and then flexible metal diaphragms 14m are attached on respective mounting surfaces of discs 14a, 14b.

Figure 7:
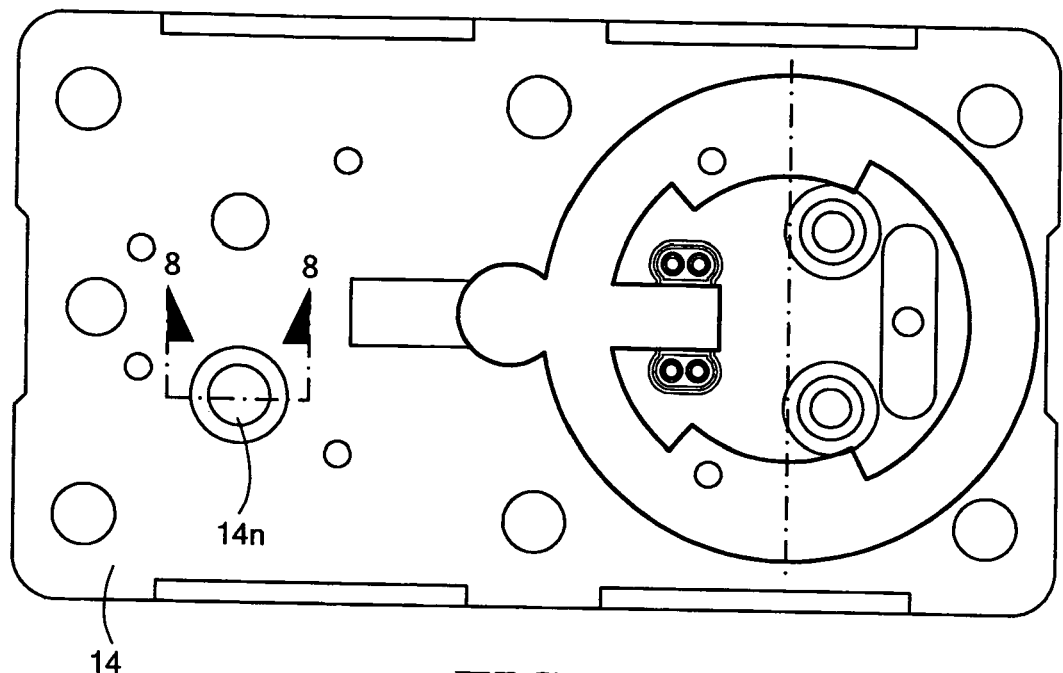
FIG. 7 is a top plan view of the sense element module shown in reduced scale.
Figure 8:
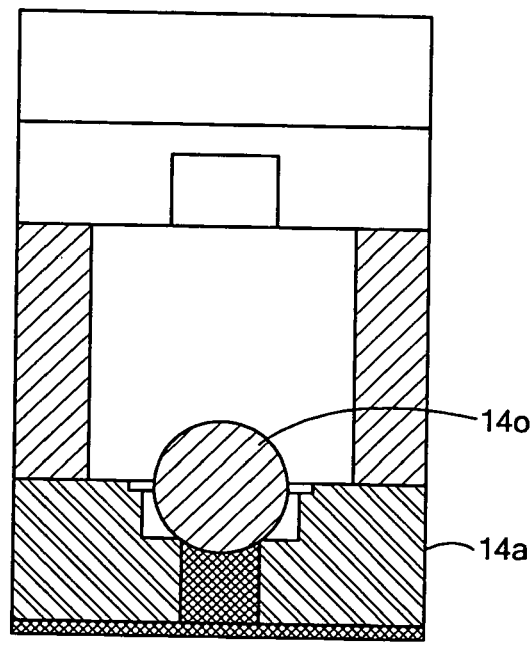
FIG. 8 is a cross sectional view taken along line 8-8 of FIG. 7.
Figure 9:
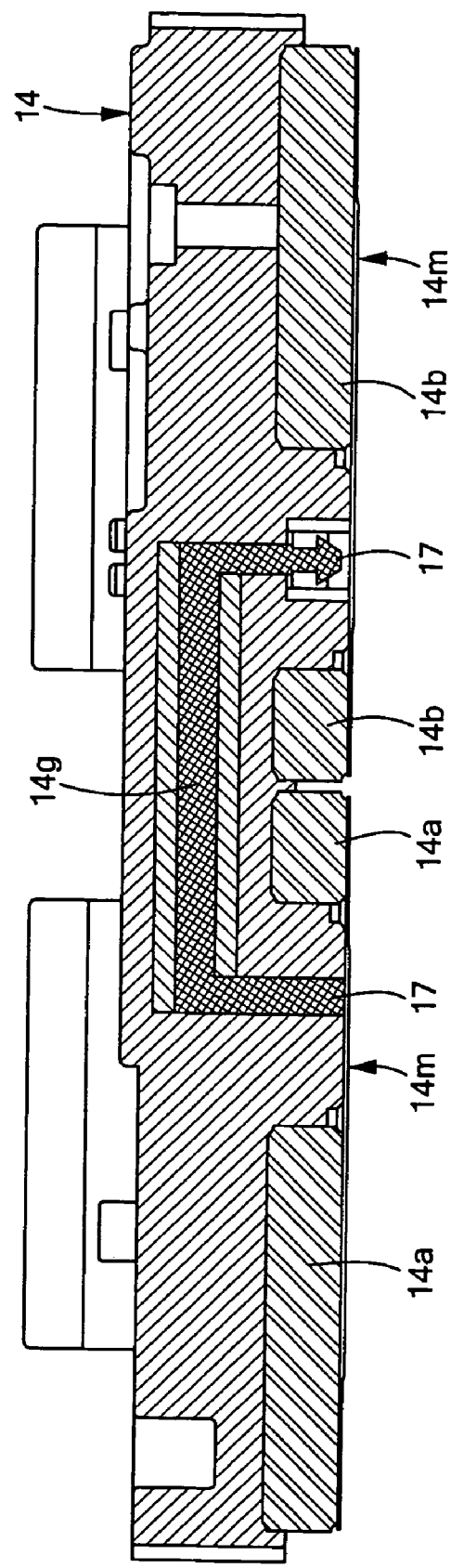
FIG. 9 is an enlarged cross sectional view similar to FIG. 4 but shown after the diaphragms have been attached and the oil chambers have been filled.

With reference to FIG. 7 showing the top surface of the sense element, as seen in FIG. 4, an oil fill hole 14n is formed through the base and each respective disc 14a, 14b. The passageway is evacuated and filled with incompressible fluid, such as silicone oil, through oil fill holes 14n and then sealed, as by ball 14o, FIG. 8, welded to a respective disc 14a, 14b providing the assembly shown in FIG. 9.

It will be understood that having both diaphragms on one side of the base simplifies the assembly process, as mentioned supra. For example, forming the adhesive rings, positioning the diaphragms and curing the adhesive can be done at the same time for both diaphragms. If desired, for further process simplification, a single piece of metal can be used rather than two separate diaphragm pieces. For long term reliability the diaphragms used need to be impermeable and robust to the sensed media (fluid). For example, for use with acidic exhaust gas media, suitable materials could include tantalum, niobium, titanium and stainless steel.

In accordance with the invention, sensor assembly 10 can be mounted with the diaphragm surfaces lying in a plane perpendicular to gravity, that is, as shown in FIG. 2. This results is a more compact sensor assembly making the need for metal brackets used in the prior art less likely. The sensor apparatus of the present invention needs only one housing part to be robust with the sensed media, i.e., lower housing 18 so that other parts can be made using less expensive materials.

Figure 10:
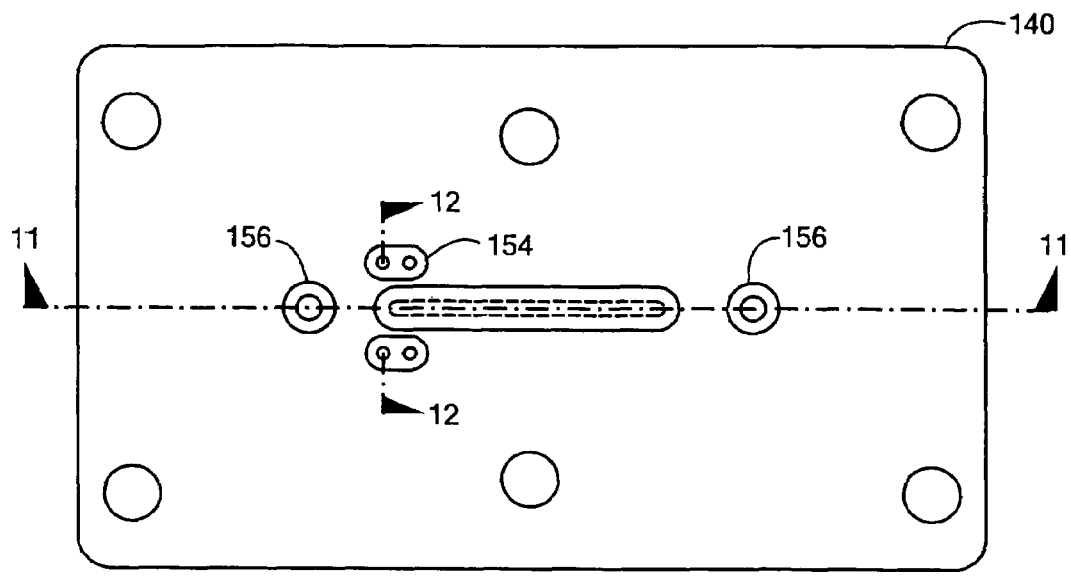
FIG. 10 is a bottom plan view of a modified sense element module.
Figure 11:
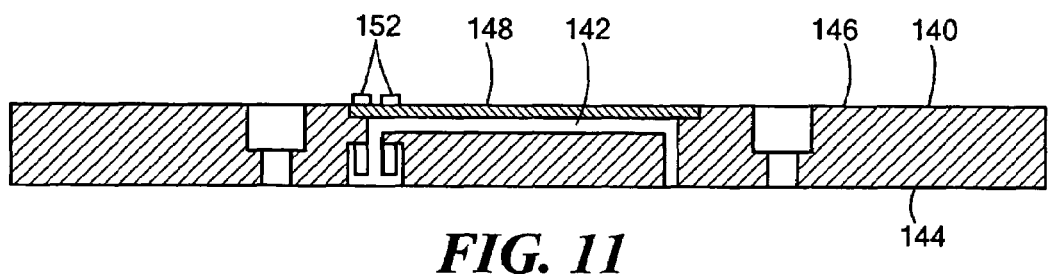
FIG. 11 is a cross sectional view taken along line 11-11 of FIG. 10.
Figure 12:
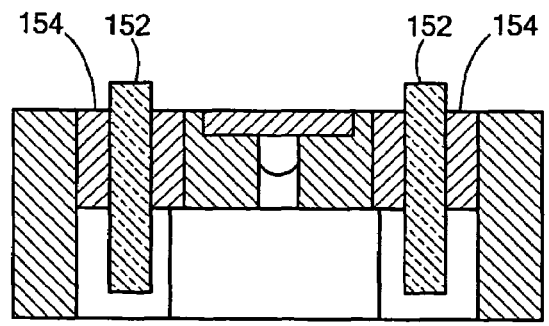
FIG. 12 is a cross sectional view taken along line 12-12 of FIG. 10.

If desired, the sense element module can be formed of materials other than the moldable plastic of FIG. 4. In accordance with a second preferred embodiment, the sense element module can be made of suitable metal, such as stainless steel, as shown in FIGS. 10-12. In FIG. 10, module 140 comprises a base member formed of stainless steel 440 and has a generally U-shaped passageway 142 opening onto a planar surface 144 so that diaphragms can be attached directly to surface 144. Passageway 142 is formed by a trench closed on top surface 146 by plate member 148 of stainless steel 440 or the like which can be welded to module 140. One opening of passageway 142 is enlarged to receive a piezoresistive sense element corresponding to element 15 of FIGS. 1, 2. Terminal pins 152 are mounted and isolated by glass seal 154. Oil fill holes 156 correspond to oil fill holes 14n of FIG. 7.

Figure 13:
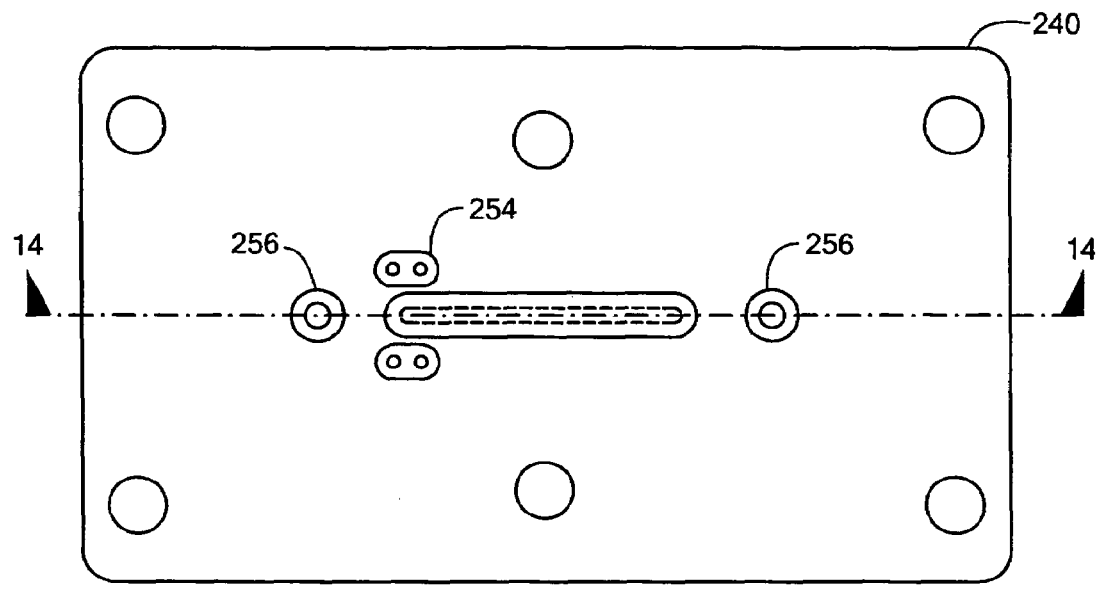
FIG. 13 is a bottom plan view of another modified sense element module.
Figure 14:
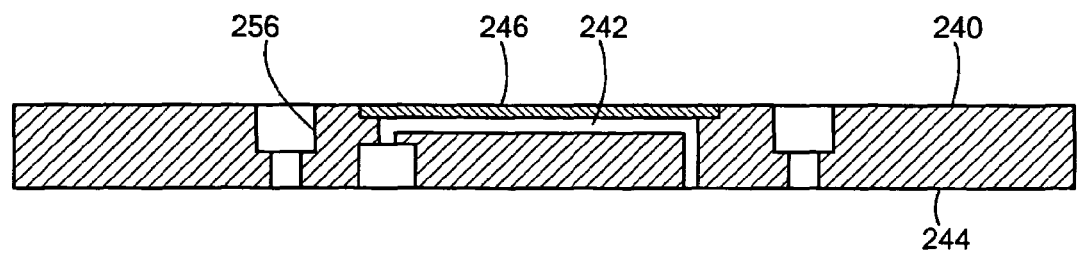
FIG. 14 is a cross sectional view taken along line 14-14 of FIG. 13.

With regard to ceramic, sensor element module 240, FIGS. 13 and 14, can be formed of alumina, for example and formed with a corresponding U-shaped passageway 242 opening through bottom surface 244 in the same manner as in module 140 embodiment. The passageway is closed by a cover 246 of alumina or the like which can be attached to module 240 with glass. Oil fill holes 256 correspond to oil fill holes 156 of the second embodiment. In this case, the oil fill holes can be sealed with a plastic plug. Terminal pins mounted with glass can be used in this embodiment as well.

As various changes could be made in the above constructions without departing from the scope of the invention, it is intended that all matter contained in the above description or shown in the accompanying drawings shall be interpreted as illustrative and not in a limiting sense.

What is claimed:

1. A differential fluid pressure sensor apparatus comprising:
   a housing mounting a sense element module,
   the sense element module having first and second diaphragm mounting surfaces facing outwardly in a common direction,
   a passageway formed in the module and extending between and forming an opening inside each respective diaphragm mounting surface,
   a respective flexible metal diaphragm mounted on each diaphragm mounting surface over each opening,
   a pressure responsive sense element disposed in one of the openings of the passageway,
   a noncompressible fluid filling the passageway and engaging the diaphragms and sealed therein,
   electrical signal conditioning circuitry operatively connected to the pressure responsive sense element, and
   first and second fluid pressure connection means for presenting respective high and low fluid pressure to the flexible diaphragms for monitoring.

2. Differential fluid pressure sensor apparatus according to claim 1 in which the first and second diaphragm mounting surfaces lie in a common plane.

3. A differential fluid pressure sensor apparatus according to claim 1 in which the sense element module is composed primarily of resinous material.

4. A differential fluid pressure sensor apparatus according to claim 1 in which the sense element module is composed primarily of metal.

5. A differential fluid pressure sensor apparatus according to claim 1 in which the sense element module is composed primarily of ceramic.

6. A differential fluid pressure sensor apparatus according to claim 1 in which the pressure sense element is a piezoresistive element.

7. A differential fluid pressure sensor apparatus comprising:
a housing,
a sense element module mounted in the housing, the sense element mounting first and second metal diaphragm mounting discs, each disc having a planar diaphragm mounting surface, the first and second mounting surfaces facing a common direction,
a window formed through each disc extending through the mounting surfaces, a passageway formed in the sense element module and extending between each respective window,
a flexible metal diaphragm mounted in fluid sealed relation to and on each first and second mounting surface and extending over each respective window,
noncompressible fluid filling the passageway and engaging the diaphragm and sealed in the passageway,
a pressure responsive sense element disposed in pressure receiving communication within the passageway at the window of one disc and responsive to the difference in fluid pressure transmitted by the respective diaphragms,
electrical signal conditioning circuitry operatively connected to the pressure responsive sense element, and
first and second fluid pressure connections mounted on the housing in fluid communication with the respective first and second diaphragms.

8. A differential fluid pressure sensor apparatus according to claim 7 in which the sense element module is composed primarily of moldable plastic and the passageway is generally U-shaped having two legs with a bight portion therebetween and the bight portion comprising a metallic tube.

9. A differential fluid pressure sensor apparatus according to claim 8 in which the first and second fluid pressure connections are part of another housing disposed adjacent to the sense element module and the said another housing is formed of material robust to fluid media to be monitored by the pressure sensor apparatus.

10. A differential fluid pressure sensor apparatus according to claim 7 in which the sense element module is composed primarily of metal.

11. A differential fluid pressure sensor apparatus according to claim 7 in which the sense element module is composed primarily of ceramic.

12. A differential fluid pressure sensor apparatus according to claim 7 in which the pressure sense element is a piezoresistive element.

13. A differential fluid pressure sensor apparatus according to claim 7 in which the diaphragm mounting surfaces of the first and second discs lie in a common plane.

* * * * *